United States Patent [19]
Underwood et al.

[11] Patent Number: 5,497,605
[45] Date of Patent: Mar. 12, 1996

[54] HEADER AND FEEDER FOR A GRAIN COMBINE

[75] Inventors: Mark R. Underwood, Burr Oak; Sushil V. Dwyer, Arkansas City, both of Kans.

[73] Assignee: Deere & Company, Moline, Ill.

[21] Appl. No.: 339,820

[22] Filed: Nov. 15, 1994

[51] Int. Cl.⁶ .......................... A01D 41/06; A01F 12/20
[52] U.S. Cl. .................. 56/14.6; 460/13; 460/69; 460/70; 460/101
[58] Field of Search ................... 56/14.5, 14.6; 460/11, 12, 13, 68, 69, 70, 80, 101

[56] References Cited

U.S. PATENT DOCUMENTS

| | | | |
|---|---|---|---|
| 1,380,636 | 6/1921 | Clove | 460/16 |
| 1,509,188 | 9/1924 | Bremser . | |
| 2,458,345 | 1/1949 | Cass | 460/17 |
| 2,841,945 | 7/1958 | Brenner | 56/122 |
| 3,828,793 | 8/1974 | Gochanour | 460/70 |
| 4,285,348 | 8/1981 | Vogel | 460/61 |
| 4,291,709 | 9/1981 | Weber et al. | 460/70 |
| 4,337,782 | 7/1982 | Da Silva | 460/64 |
| 4,489,733 | 12/1984 | Underwood | 460/68 |
| 4,900,290 | 2/1990 | Tanis | 460/70 |
| 4,910,946 | 3/1990 | Underwood | 56/14.4 |
| 5,045,025 | 9/1991 | Underwood | 460/66 |
| 5,344,367 | 9/1994 | Gerber | 460/68 |

*Primary Examiner*—George A. Suchfield
*Attorney, Agent, or Firm*—James E. Bradley; Mark W. Handley

[57] ABSTRACT

A grain combine according to the present invention includes a header having two sickles which extend on opposite sides of the combine for severing crop from a field, and two augers which extend on opposite sides of the combine for moving crop inward to central section of the combine. A centerline drive mechanical power transfer means directly connects to the two sickles and two augers at a point intermediate of the two sickles and two augers. A feeder has two conveyors, one located above the other, for transporting crop from the header to a primary threshing rotor. The two conveyors converge towards an aft end of the feeder to compress the crop therebetween. A perforated plate is provided beneath the aft end of the feeder for separating prethreshed grain from the crop. The prethreshed grain is passed through the perforated plate, onto a prethreshed grain conveyor and transported to a sieve section. The feeder passes the crop into the combine and through a cover plate having two apertures for passing the crop to opposite sides of a threshing rotor. The cover plate further has rearward facing bars. An impeller is mounted to the forward end of the threshing rotor and includes forward facing rasp bars which press the crop into the cover plate and the rearward facing bars mounted to an aft end of the cover plate.

45 Claims, 9 Drawing Sheets

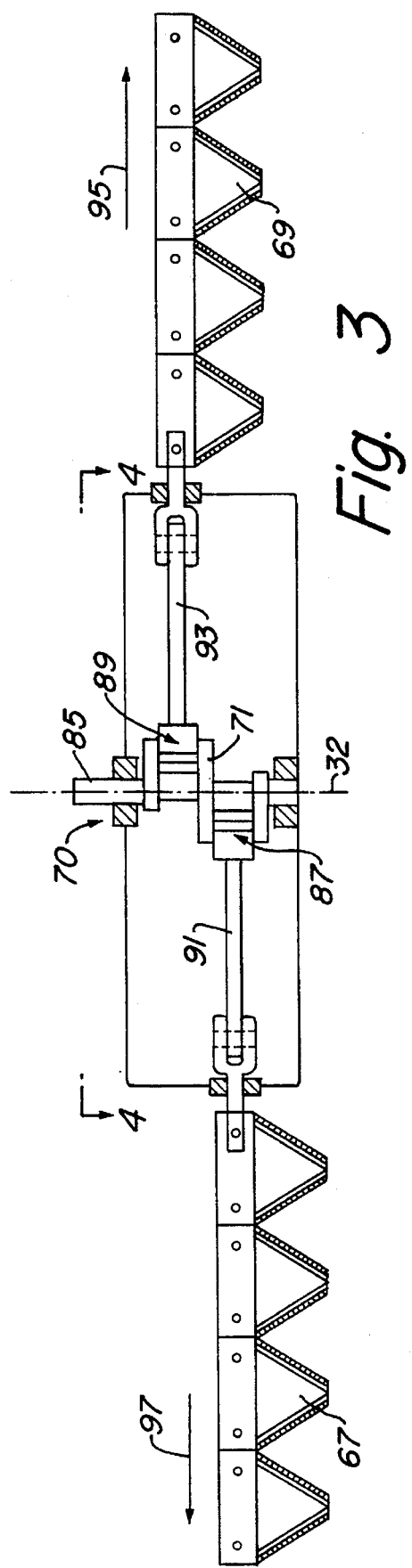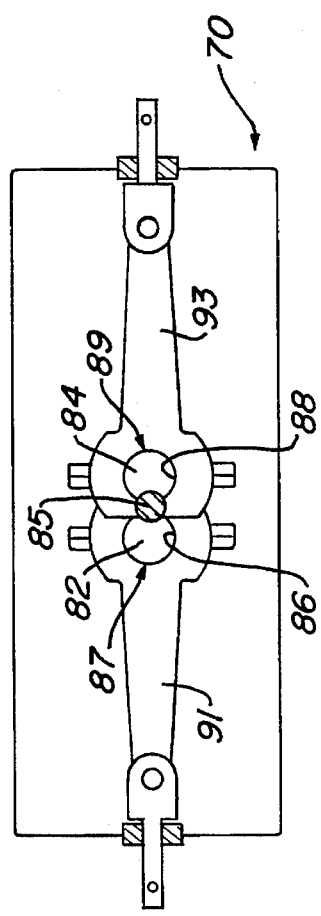

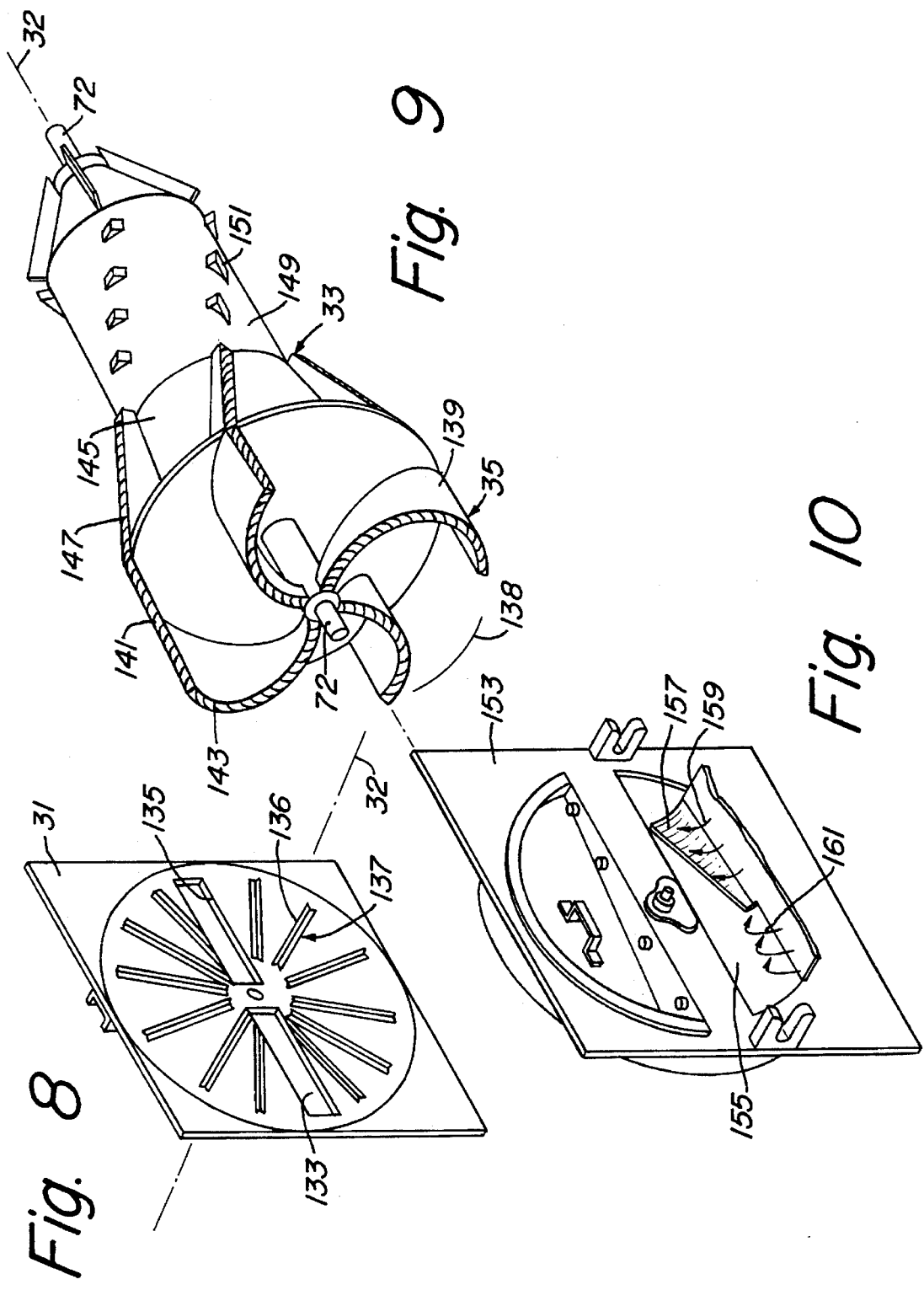

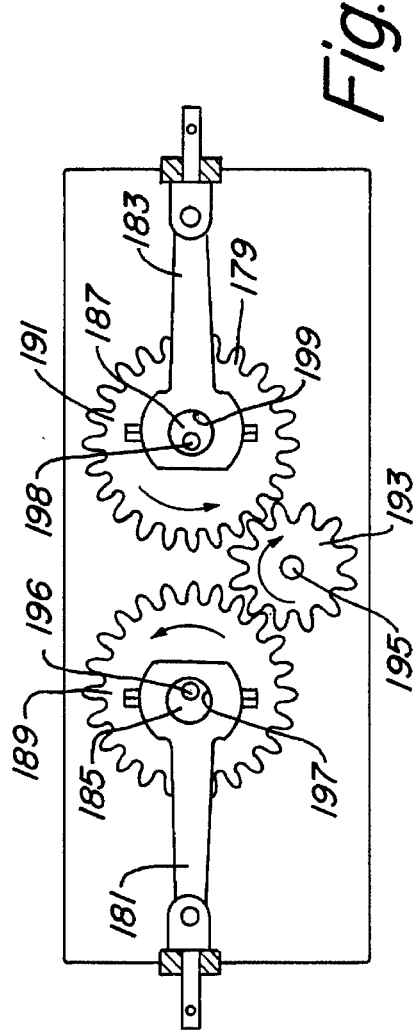
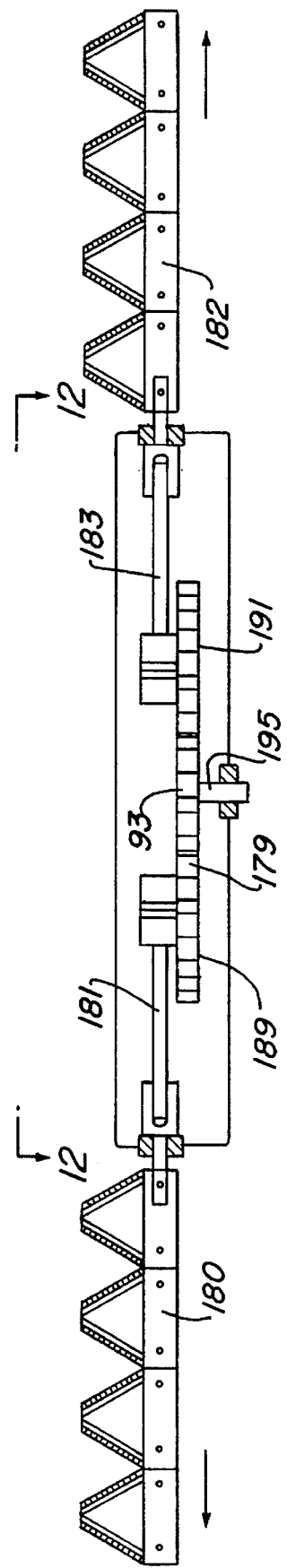
Fig. 12
Fig. 11

HEADER AND FEEDER FOR A GRAIN COMBINE

BACKGROUND OF THE INVENTION

1. Field of the Invention

This invention relates in general to grain harvesting combines, in particular to an improved header and feeder for cutting crop from a field and passing a crop to a primary threshing rotor.

2. Description of the Prior Art

A grain harvesting combine has a header which includes a sickle for severing crop from a field, and an auger which directs the crop inward to a discharge port in a rearward portion of the header. The cut crop is then fed upward through a feeder to a threshing assembly which includes a threshing rotor and a perforated housing. The threshing rotor rotates within the perforated housing, passing grain within clearances between the threshing rotor and a perforated housing to thresh grain from the crop. The threshed grain falls through the perforations in the perforated housing onto a grain pan, and from the grain pan onto a set of upper and lower sieves. The sieves are oscillating, causing clean grain to fall through for collection. A blower blows air upward through the sieves, discharging chaff to the rear. Straw from the primary threshing chamber proceeds through a straw beater and out the rear of the combine. The clean grain is collected and conveyed to a storage bin.

Prior art headers for grain combines extend outward on opposite lateral sides of the grain combines and are up to thirty feet in length. Mechanical power for reciprocating the sickle to cut crop and for rotating the auger to pass the crop inward to the header discharge port is provided by a power transfer means located on an outward end of the header. This requires transmission of mechanical power to the power transfer means on the outward end of the header, usually by means of a laterally extending drive shaft coupled to the combine motor by another drive shaft which extends longitudinally along the combine. Mechanical power is transferred by rotating the longitudinally and laterally extending shafts to reciprocate the sickle and rotate the auger. Power is then transferred through the sickle and auger to the portions of the sickle and auger on the opposite end of the header from the outward end at which the drive shaft connects to the power transfer means, the sickle and the auger. Such means for transferring power to operate the sickle and auger is both cumbersome and inefficient.

Prior art feeders typically are provided by conveyor belts, elevators, or some other type of conveyance means, and merely serve to transport the crop from the header up into the combine. Often the crop being passed into the threshing assembly includes stalks which are stiff and rigid. This reduces the speed at which crops may be fed into the threshing assembly, as well as requiring additional forces within the threshing rotor to loosen grain from the straw. This results in slowing down the speed at which crops can be harvested.

Prior art combines typically pass crop from the feeder, through a single port, and directly into the clearances between the threshing rotor and perforated housing. The threshing assembly may include an impeller mounted to the threshing rotor for driving the crop outward into the clearances between the threshing rotor and the perforated housing, and for forcing the crop rearward within the clearances. However, since the crop passes from the feeder and into the threshing assembly through a singular port, crop often loads upon one side of the threshing rotor and is not equally distributed within the threshing assembly.

Prior art impellers include rasp bars mounted to the outermost, outward facing ends defining the outer circumference of the impellers. This typically initiates softening and threshing of the crop, as the crop is pressed into the clearances between the threshing rotor and the perforated housing. Crop is not threshed or softened for passing through the threshing assembly as it passes from the header, through the feeder, and through the forward end of the threshing assembly. Thus, the crop passes through the combine for a significant distance prior to threshing, or softening for passing within the threshing assembly.

The speeds at which combines may be operated for harvesting grain are often limited by the rates at which crop may be fed, or pressed, into the clearances around the primary threshing rotor. Typically, the more rigid the crop that is being fed into the impeller and around the primary threshing rotor, the slower the combine must be operated. Additionally, when crop passes on only one side of the impeller and threshing rotor, crop buildups on the one side of the threshing rotor cause crop jams when grain harvesting combines are operated at faster speeds.

SUMMARY OF THE INVENTION

A grain combine according to the present invention includes a header having two sickles which extend on opposite sides of the combine for severing crop from a field, and two augers which extend on opposite sides of the combine for moving crop inward to central section of the combine. A centerline drive mechanical power transfer means directly connects to the two sickles and two augers at a point intermediate of the two sickles and two augers. A feeder has two conveyors, one located above the other, for transporting crop from the header to a primary threshing rotor. The two conveyors converge towards an aft end of the feeder to compress the crop therebetween. A perforated plate is provided beneath the aft end of the feeder for separating prethreshed grain from the crop. The prethreshed grain is passed through the perforated plate, onto a prethreshed grain conveyor and transported to a sieve section.

The feeder passes the crop into the combine and through a cover plate having two apertures for passing the crop to opposite sides of a threshing rotor. The cover plate further has rearward facing bars. An impeller is mounted to the forward end of the threshing rotor and includes forward facing rasp bars which press the crop into the cover plate and the rearward facing bars mounted to an aft end of the cover plate. Grain is threshed by rotating the threshing rotor and a perforated cylinder. The perforated cylinder rotates in the same direction as the threshing rotor, but at a slower speed. A sieve section receives threshed crop from the primary threshing rotor and separates grain from chaff and tailings. A clean grain conveyor transports clean grain which passes through the sieve section to a storage bin.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a top view depicting a centerline drive power transfer means for a sickle made according to the present invention;

FIG. 4 is a schematic sectional view taken along section line 4—4 of FIG. 3;

FIG. 8 is a perspective view of a rearward facing side of a cover plate extending between the feeder and the primary threshing according to the present invention;

FIG. 9 is a perspective view of a threshing rotor having an impeller according to the present invention;

FIG. 10 is a perspective view of a forward end of an alternative cover plate according to the present invention;

FIG. 11 is a top view of a centerline drive for a sickle means constructed in accordance with an alternative embodiment of the present invention;

FIG. 12 is a sectional view taken along section line 12—12 of the alternative centerline drive for the sickle means of FIG. 11.

DETAILED DESCRIPTION OF THE PREFERRED EMBODIMENT

Figure 1:
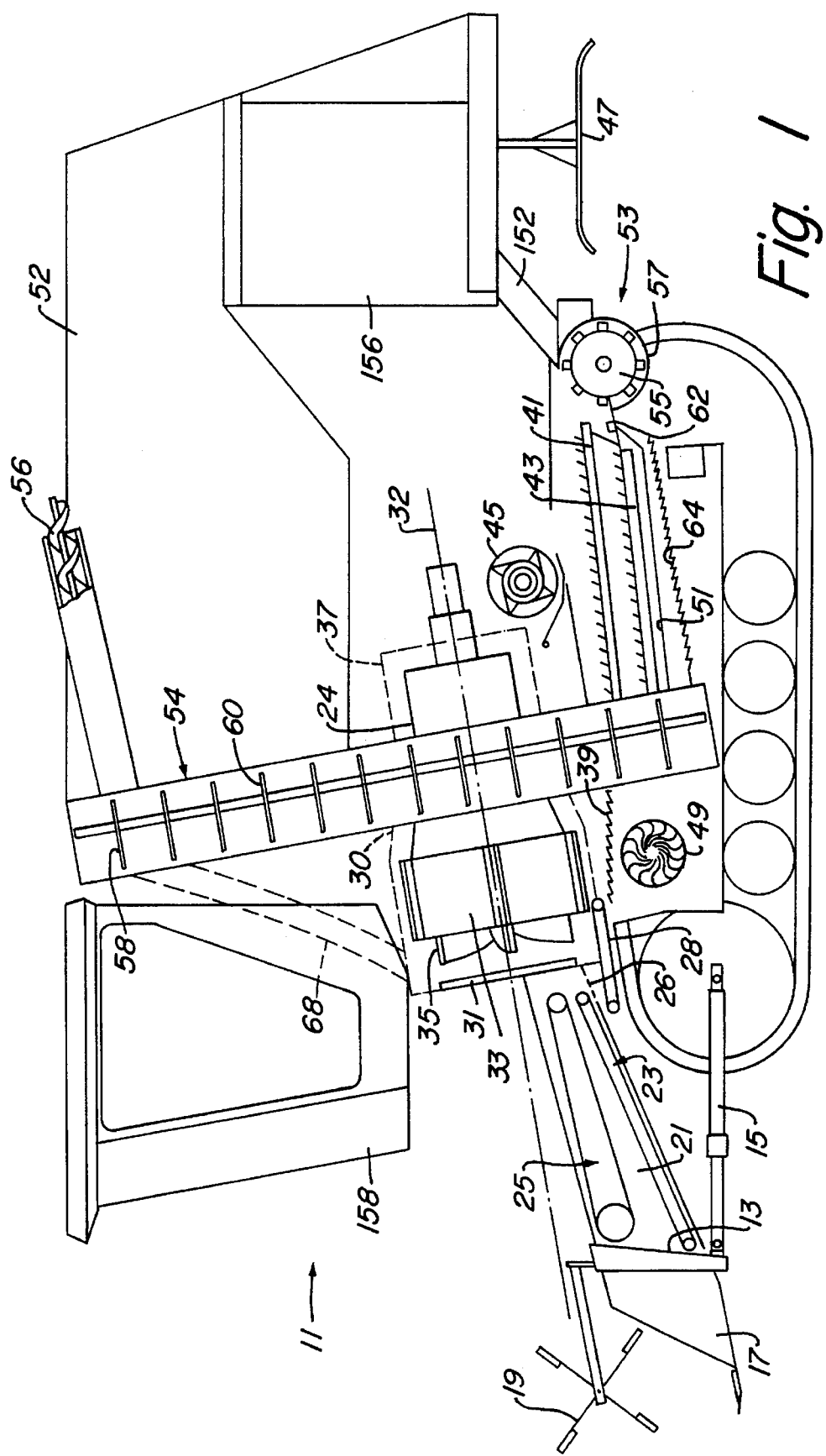
FIG. 1 is a schematic side elevational view illustrating the major components of a combine constructed in accordance with the present invention.

Referring to FIG. 1, combine 11 has header support 13 and will pivot upward and downward by means of hydraulic cylinders 15 to control the height of the cut. Header support 13 will secure to header 17, reel 19 and feeder 21. Feeder 21 has a lower conveyor 23 and upper conveyor 25 for transporting crop to primary threshing assembly 24. Perforated plate 26 extends beneath the aft end of feeder 21 for separating prethreshed grain from crop passing through feeder 21. Plate 26 vibrates, or is shaken, for passing grain through the perforations. Prethreshed grain conveyor 28 extends from beneath perforated plate 26 for transporting prethreshed grain from beneath plate 26.

Combine 11 has central housing 30 which defines a central axis 32. In the preferred embodiment, central axis 32 extends along a centerline passing longitudinally through forward and aft ends of central housing 30 and combine 11. Cover plate 31 is provided for entry into central housing 30 and threshing assembly 24, which is located within central housing 30. Rotor 33 is oriented for rotating about central axis 32 of combine 11. It should be noted that as referenced herein, a centerline for combine 11 is often referred to herein to represent a plane extending vertically through combine 11 in a longitudinal direction, and including central axis 32 for orienting, in vertical alignment, that is, in alignment with the vertical plane, crop flow from header 17, through feeder 21, and through threshing assembly 24.

Threshing assembly 24 includes rotor 33 and perforated housing 37. Rotor 33 is rotated within perforated housing 37. In the preferred embodiment, housing 37 is also rotated in the same direction as rotor 33, but at a lesser speed. Crop is passed through clearances between rotor 33 and perforated housing 37 to thresh grain. Impeller 35 has blades which are provided on the forward end of rotor 33, and which in the preferred embodiment of the present invention are mounted directly to, and are a part of, rotor 33.

Grain which is threshed in the clearances between housing 37 and rotor 33 falls through the perforations in housing 37 and onto a shoe 39. The grain will move down the shoe in a rearward direction onto sieves 41, 43. The straw from the crop is discharged out the rearward end of the housing 37 into a transverse beater 45 and out the rear end of combine 11. A rotating spreader 47 spreads the straw on the ground.

Sieves 41, 43 are rectangular members that oscillate back and forth. Sieves 41, 43 have a plurality of fingers which define apertures for the properly threshed grain to fall through. A blower 49 blows air upward through the sieves 41, 43 and out the rear of combine 11. Chaff will be blown outward along with the air. The clean grain falls through sieves 41, 43 onto an inclined clean grain pan 51. Prethreshed grain conveyor 28 extends from beneath perforated plate 26 to shoe 39. Prethreshed grain will then be moved along shoe 39 to sieves 41, 43. It should be noted that in other embodiments of the present invention, prethreshed grain may be conveyed directly to the sieves, or directly to clean grain pan 51 for passing to storage bin 52. Clean grain travels down clean grain pan 51, through elevator 54, out auger 56 and to storage bin 52. Elevator 54 is rectangularly shaped and continuously extends around combine 11. Elevator 54 includes clean grain paddles 58 and tailings paddles 60, which are spaced apart on opposite sides of a partition to provide compartments for separately transporting clean grain and tailings.

Grain which is only partially threshed will not fall through the openings in the sieves 41, 43, but rather will fall down into a rethreshing section 53 for subsequent rethreshing since it is too heavy to be blown out with the chaff. Rethreshing section 53 includes rethreshing rotor 55 which rotates within housing 57. Rotor 55 and housing 57 extend fully across the aft end of sieves 41, 43. Optional blowers 74 may be provided to remove chaff from tailings.

Rethreshed tailings are passed from rethreshing section 53, through discharge 62 and to tailings pan 64. Rethreshed tailings then travel from pan 64, into elevator 54 where they are transported by paddles 60 to chute 68. Tailings then fall down chute 68 for passing by primary threshing rotor 33 again. It should be noted that in other embodiments, clean grain may be separated from tailings by a perforated plate and passed to either of sieves 41, 43, or directly to clean grain pan 51. Clean grain may also be separated at chute 68 for passing directly to auger 56 and bin 52.

Figure 2:
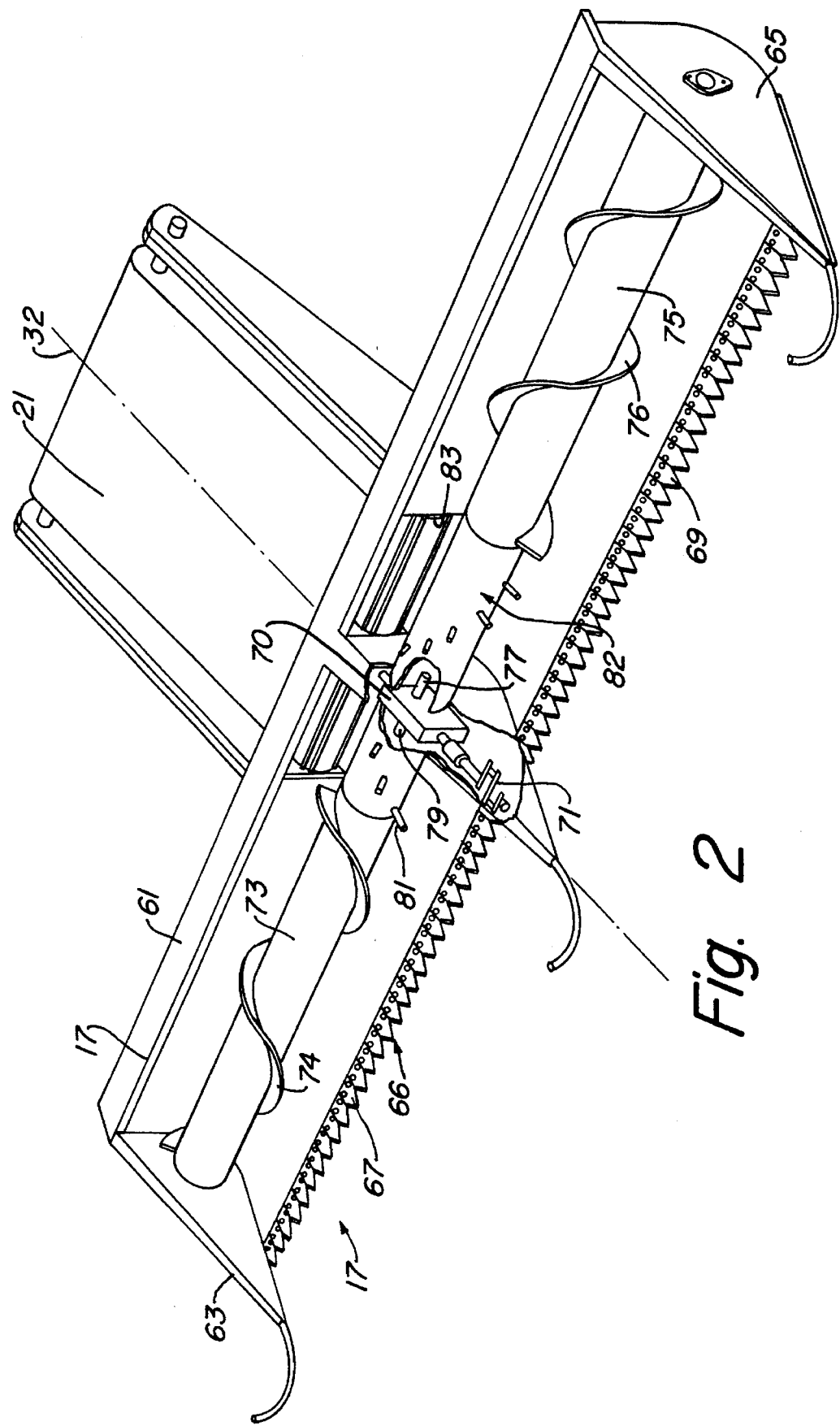
FIG. 2 is a partial cut away, perspective view depicting a centerline drive header according to the present invention.

FIG. 2 is a perspective view, with a partial section, depicting header means 17 and feeder means 21. Header means 17 has header housing 61, without outer ends 63 and 65 which extend distally on opposite ends on centerline 32. It should be noted that outer ends 63, 65 extend for substantial distances aside of the forward portion of combine 11. In the preferred embodiment, outer ends 63 and 65 extend for substantially equal distances on opposite sides of centerline 32. Header means 17 further includes sickle means 66 for severing crop from the field. Sickle means 66 includes sickles 67, 69, which together define two separately disposed sickle sections. Sickles 67, 69 are driven by header drive means 70 relative to header housing 61 to sever crop by shearing. Header drive means 70 is a header centerline drive, which in this preferred embodiment is substantially disposed in vertical alignment with central axis 32. Header drive means 70 includes crankshaft 71 which is connected to main drive shaft 72 (shown in FIG. 6). Main drive shaft 72 extends through rotor 33 (shown in FIG. 1). Crank shaft 71 rotates to reciprocate sickles 67, 69 in relation to header housing 61, in opposing directions which are lateral to central axis 32 for severing crop from the field.

Header 17 further includes augers 73, 75 which are rotatably secured within header housing 61. Augers 73, 75 include blades 74, 76 which spiral around the cylindrical portions of augers 74, 75 for moving crop inward along augers 73, 75. Splined shafts 77, 79 are secured between augers 73, 75 and are included within header drive means 70 for rotating the augers 73, 75 around an axis which is transverse to central axis 32. Fingers 81 are provided intermediate between augers 73, 75 and are mounted for rotating therewith. In the preferred embodiment, transport means 82 is provided by augers 73, 75, and fingers 81. Fingers 81 rotate with augers 73, 75 for pushing cut crop through central discharge port 83 and into feeder 21. It should be noted that central discharge port 83 is located between outer ends 63, 65 of header housing 61, and that in the preferred embodiment, header discharge port 83 is centrally disposed and centered between outermost ends 63, 65.

FIG. 3 depicts a top view of a sickle drive portion of header drive means 70, which includes crankshaft 71. Crankshaft 71 is connected to shaft 85, which interconnects between crankshaft 71 and main drive shaft 72 (shown in FIG. 6). Bearings 87, 89 are mounted to crankshaft 71, and are offset from a main axis of rotation of crankshaft 71 for eccentric rotation therewith. In the preferred embodiment, bearings 87, 89 are journal bearings having journals which are part of crankshaft 71, and bearing portion which are part of connecting rods 91, 93. Connecting rods 91, 93 are secured exteriorly about crankshaft 71 by offset bearings 87, 89. Rotation of crankshaft 71 rotates offset bearings 87, 89 to reciprocate connecting rods 91, 93, and sickles 67, 69, which are connected to connecting rods 91, 93, respectively. Thus, sickles 67 and 69 are reciprocated in directions 95, 97, which are lateral to the centerline extending along central axis 32.

FIG. 4 depicts a sectional view taken along section 4—4 of FIG. 3. Connecting rods 91, 93 are depicted, with drive shaft 85 schematically depicting the axis of rotation for crank shaft 71. Bearings 87, 89 have journals 82, 84 formed on crankshaft 71, shown in cross section, and bearing portions 86, 88 provided by the ends of connecting rods 91, 93.

Figure 5:
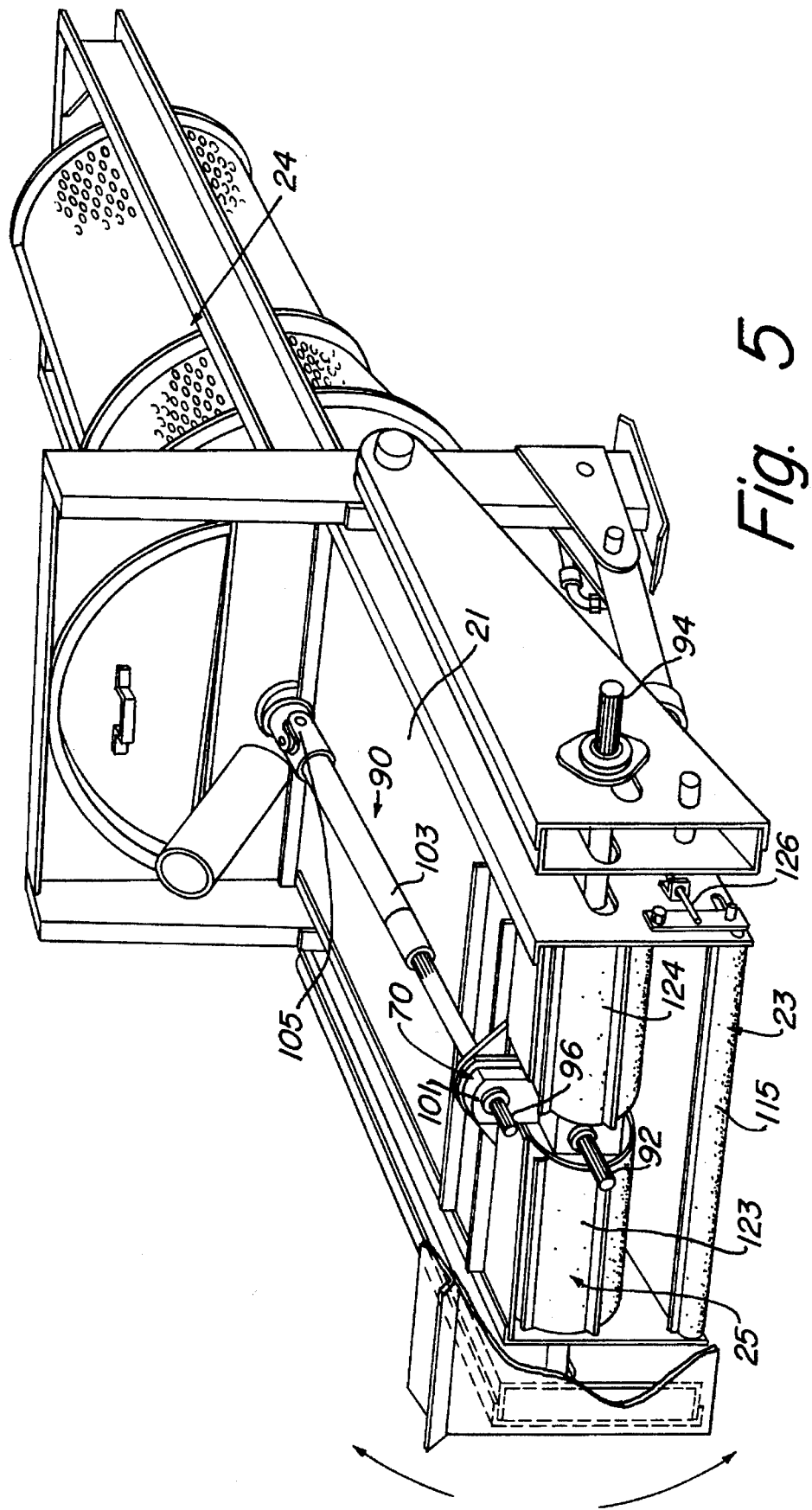
FIG. 5 is a perspective view of a feeder and threshing assembly having a centerline drive according to the present invention.

FIG. 5 is a perspective view of feeder 21, primary threshing assembly 24, and depicts a portion of centerline drive 90. Splined shaft 92 extends from hydraulic clutch 101 for providing mechanical power from shaft 103 to header drive means 70 (shown in FIG. 6). Hydraulic clutch 101 is a hydraulically actuated power transfer means, such as is well known in the art. Drive shaft 103 is connected to main rotor drive shaft 72 (shown in FIG. 6) by knuckle joint 105. Splined shaft 94 is provided for powering prior art headers which may be used with feeder 21 and combine 11 in place of header 17. Splined shaft 96 is provided for powering other devices, or combine attachments, such as sprayers.

The forward portion of conveyors 23, 25 are also depicted in FIG. 5. In the preferred embodiment, upper conveyor 25 has two laterally disposed belts 123, 124. Lower conveyor 23 is provided with a singular belt 115. It should be noted that laterally disposed belts 123, 124 are provided for accommodating hydraulic clutch 101 of centerline drive 70 therebetween. In other embodiments of the present invention having a centerline type of header drive, a non-threshing type of feeder may be provided having only a singular lower conveyor with dual belts for accommodating a centerline drive therebetween. An adjustment means 126 (one shown) is provided on both sides of feeder 21 to adjust the belt pitch length for conveyor 23.

Figure 6:
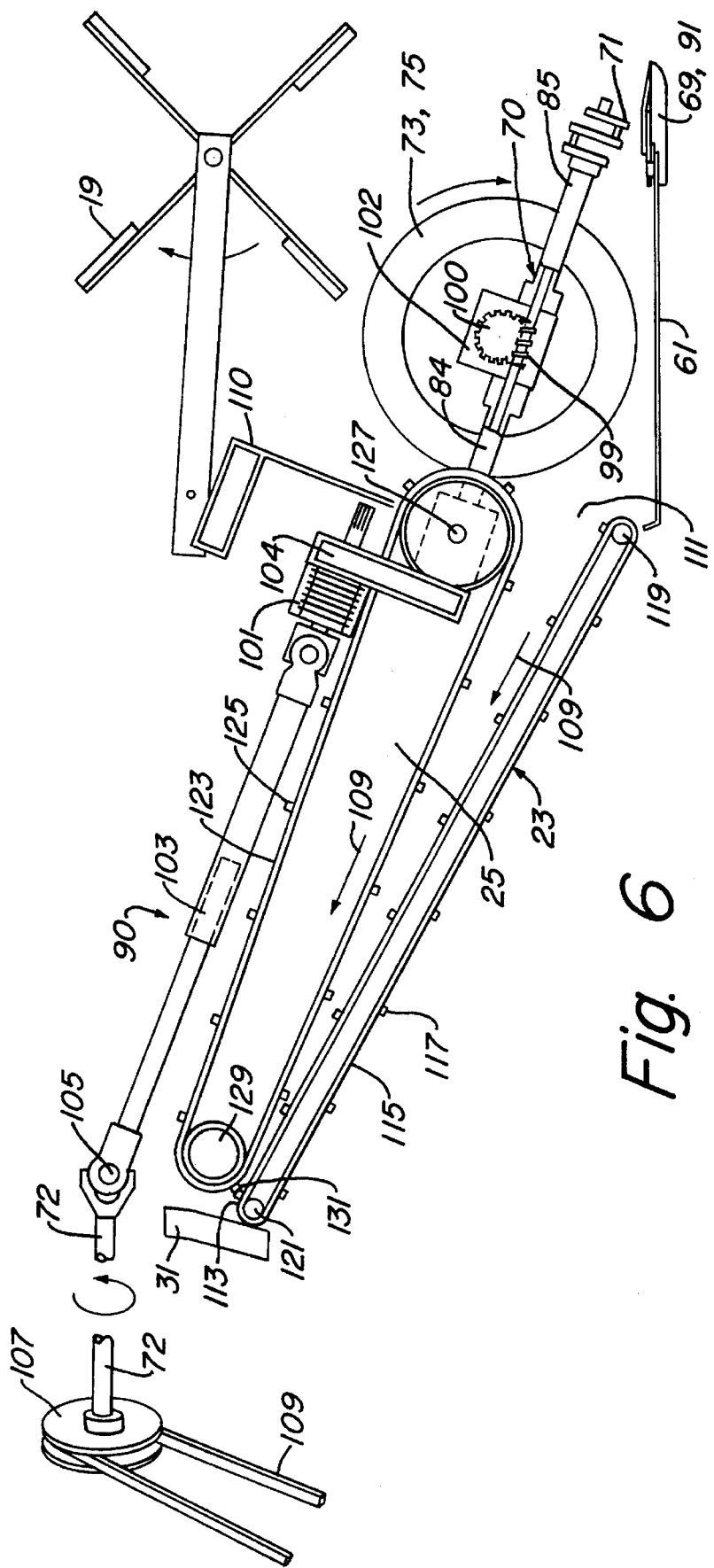
FIG. 6 is a schematic side elevational view, taken from the right side of a combine, depicting a feeder and header having centerline drive according to the present invention.

FIG. 6 is a side elevational view, taken from the right side of combine 11, which schematically depicts header 17, feeder 21, and centerline drive 90. Augers 73, 75 are driven by worm gear 99 in combination with driven gear 100, which together with splined shafts 77, 79 (shown in FIG. 2) provide auger drive portion 102 of centerline drive 90. Hydraulic clutch 101 connects shaft 103 to chain drive 104. Chain drive 104 transfers power from hydraulic clutch 101 to shafts 84, 85. Chain drive 104 includes sprockets which are sized to reduce to one half the rotational speed transmitted from shaft 103, which is designed to operate at 1000 rpm, to the speed at which shafts 84, 85 are driven, 500 rpm.

Shaft 84 is connected to auger drive 102 and shaft 85 for rotating augers 73, 75 and reciprocating sickles 67, 91. Reel 19 is connected to hydraulic clutch 101 by reel drive means 110. Telescoping drive shaft 103 connects to hydraulic clutch 101. Telescoping drive shaft 103 has an aft end which is connected to main drive shaft 72 by knuckle joint 105. The rearmost end of drive shaft 72 is connected to pulley sheave 107, which is in turn connected to the main motor for driving combine 11 by pulley belt 109. It should be noted that the main drive shaft 72 is rotated at speeds which may be selected by the combine operator. Drive shaft 72, pulley sheave 107, and pulley belt 109 provide a power transfer means of a type which could be used for transferring power to either of sickle means 66, auger transport means 82, or reel 19 in other embodiments of the present invention.

Still referring to FIG. 6, feeder means 21 has a first, or forward end 111 and a second, or aft end 113. Conveyor 23 includes continuous lower conveyor belt 115 having ribs 117 which extend laterally across lower conveyor belt 115. Conveyor belt 115 extends continuously around rollers 119, 121. Conveyor 25 includes dual continuous conveyor belts 123, 124 (one shown) having laterally extending ribs 125. Conveyor 25 further includes rollers 127, 129, about which conveyor belt 123 continuously extends. Rollers 121, 129 define compression point 131, which laterally extends across feeder 21 at aft end 113. Conveyors 23, 25 converge in passing from forward end 111 to aft end 113 for pressing therebetween crop which is passing through feeder 21. Feeder 21 passes crop from aft end 113 and through cover plate 31. Conveyor belts 115, 123 move in directions 109, and may be operated at different linear speeds.

Figure 7:
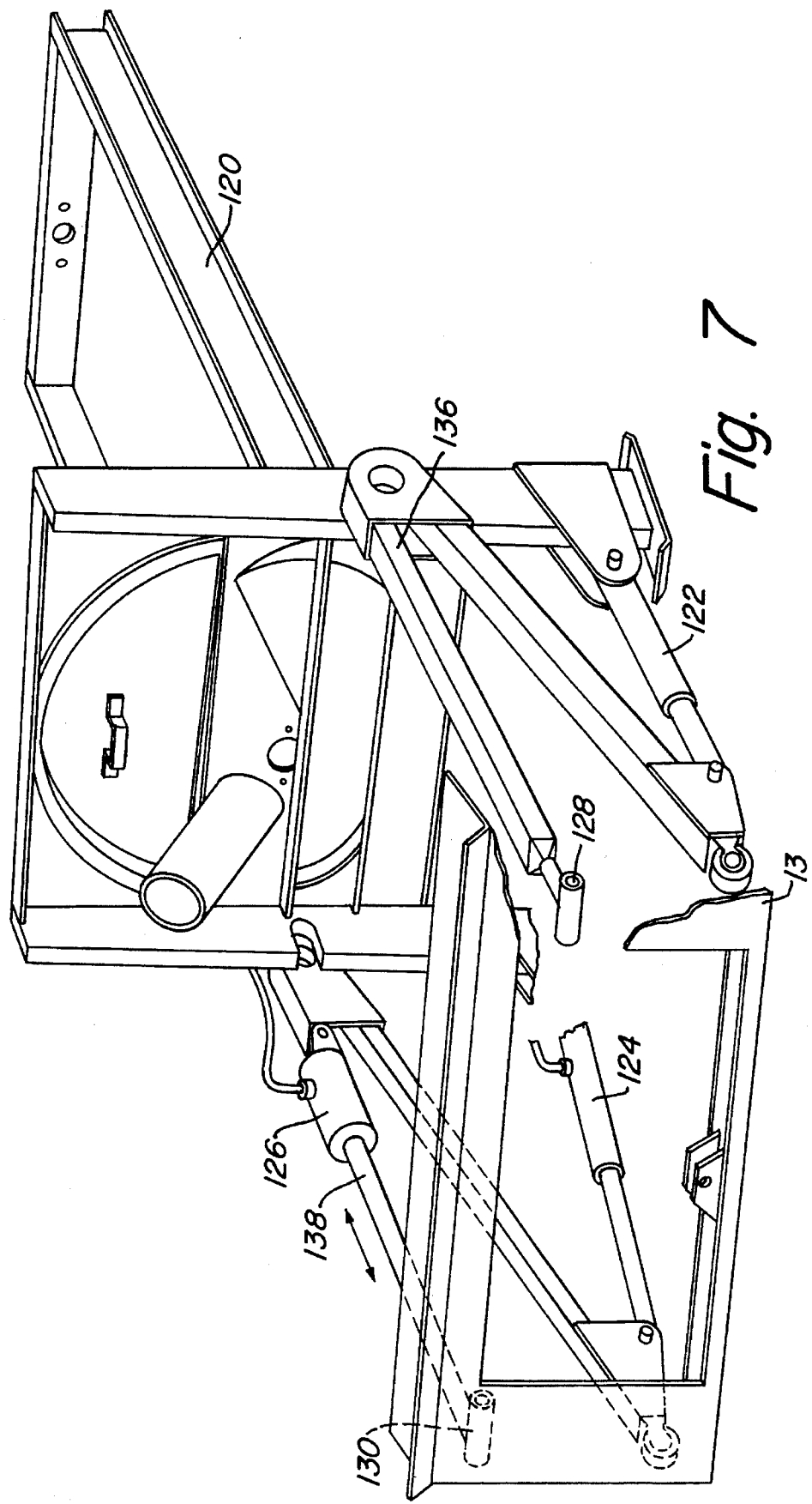
FIG. 7 is a perspective view of a frame for the header and feeder according to the present invention.
Figure 13:
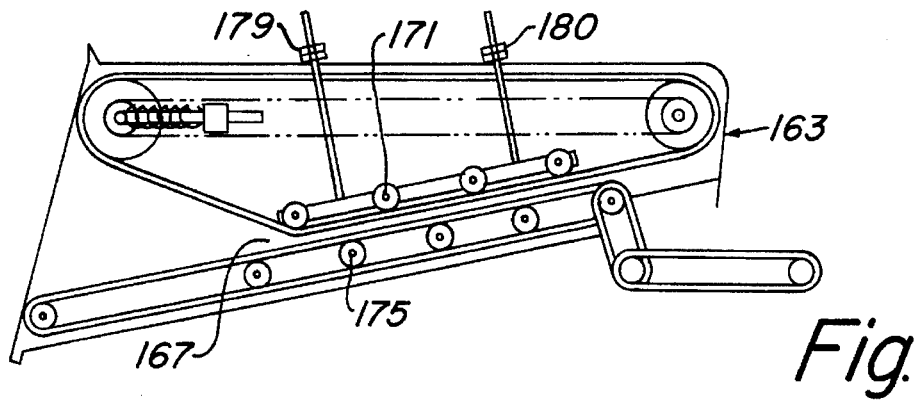
FIGS. 13 through 16 are side elevational views which schematically depict feeders constructed in accordance with alternative embodiments of the present invention.
Figure 14:
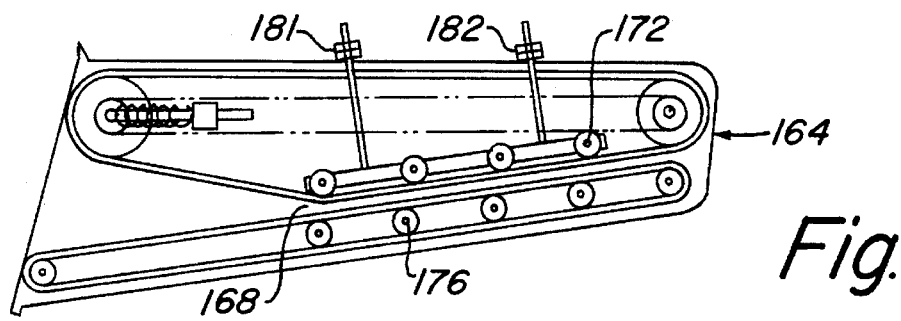
Figure 15:
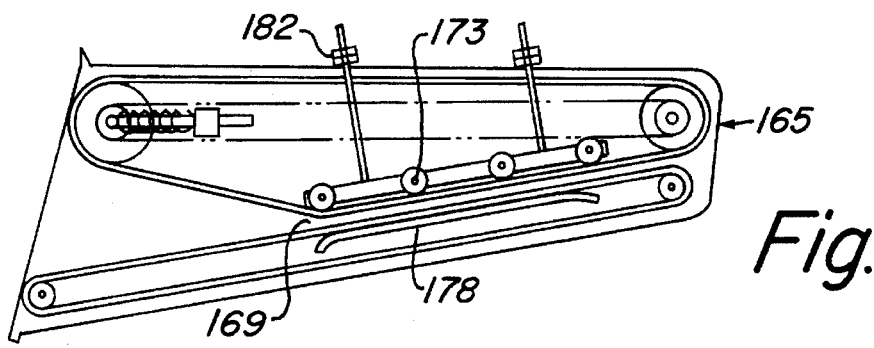
Figure 16:
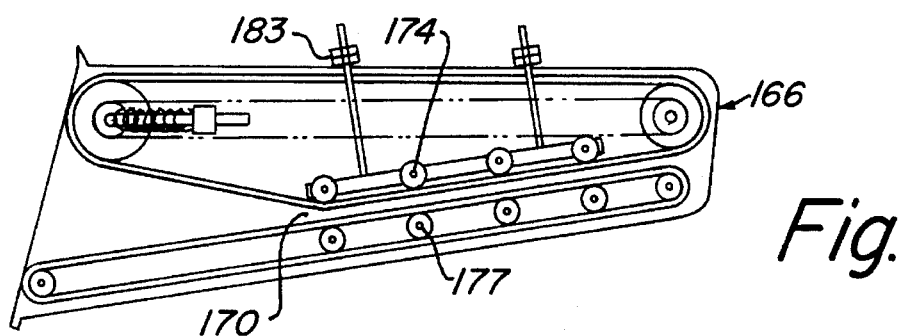

FIG. 7 is a perspective view of a frame 120 for threshing assembly 24 and feeder 21 (shown in FIG. 1). Frame 120 includes header support 13. Hydraulic cylinders 122, 124 control the height of cut for header 17 (shown in FIG. 1). Hydraulic cylinder 126 controls the lateral tilt of header 17 and feeder 21 for hills and uneven terrain. Adjustment means 128, 130 are provided for adjusting the pitch length for upper conveyor 25. Adjustment means 128, 130 are each provided by threaded rods which threadingly engage within support arms 136, 138.

FIG. 8 is a perspective view depicting the rearward facing end of cover plate 31. In the preferred embodiment of the present invention, cover plate 31 is nonrotatably secured to define the stationary forward end of central housing 30 and threshing assembly 24 (shown in FIG. 1). Cover plate 31 includes two apertures 133, 135, and bars of angle iron 137. Angle iron 137 is mounted to cover plate 31 with one side flat against the rearward end of plate 31, and the other side extending outward to provide rearward facing, stationary bars 136 against which corp is pressed and pushed across by impeller 35. In the preferred embodiment, stationary bars 136 provided by the angle iron sides extend as stationary, rearward facing blades. Stationary bars 136 of the angle iron 137 provide a rough, or rippled surface for the rearward end of cover plate 31 to thresh crop against.

Apertures 133, 135 are spaced apart on opposite sides of central axis 32, which extends through the center of cover plate 31 and through the center of main shaft 72 (shown in FIG. 9). Central axis 32 extends in the direction of crop flow from feeder 21, and apertures 133, 135 are provided for receiving the crop from feeder 21 and directing the crop to flow to distal positions on opposite sides of primary threshing rotor 33.

FIG. 9 is a perspective view of threshing rotor 33 and impeller 35. In the preferred embodiment of the present invention, impeller 35 is rigidly mounted to rotor 33, and both impeller 35 and rotor 33 are secured to main drive shaft 72 for rotating therewith. Impeller 35 includes outwardly extending, curved blades 139 and outer rasp bars 141. Outer rasp bars 141 are mounted to the outermost portions of blades 139 which define an outer circumference for impeller 35. Forward facing rasp bars 143 are provided on the forward facing ends of blades 139. In the preferred embodiment of the present invention, forward facing rasp bars 143 are provided for directly facing rearward facing angle iron 137 of cover plate 31 (shown in FIG. 8) for rotating relative to cover plate 31 to press crop therebetween. Rotating impeller 35 in relation to cover plate 31 both softens the crop for passing between rotor 33 and perforated housing 37, in addition to threshing grain from the crop.

Referring to FIGS. 8 and 9, cover plate 31 is aligned with threshing rotor 33 and impeller 35 so that apertures 133, 135 horizontally extend, for equal distances, on opposite sides of shaft 72. Rotation of blades 139 of impeller 35 in direction 138 causes the crop passing through aperture 133 to move upward, and the crop passing through aperture 135 to move downward. Thus apertures 133, 135, in combination with the rotating blades 139 of impeller 35, direct the crop to flow into different directions and to distal positions in threshing assembly 24, and preferably to opposite sides of primary threshing rotor 33.

Referring to FIG. 9, rotor 33 includes conical forward body portion 145, having outer rasp bars 147. Rotor 33 further includes rearward cylindrical body portion 149 having outer rasp bars 151, which are spaced apart and extend outward in spiraled patterns around cylindrical body portion 149. Rotor 33 is rotated to press crop between rasp bars 141, 147, 151, and into perforated housing 37.

Referring again to FIG. 1, other components of combine 11 include a frame 152 which is mounted in this embodiment on rubber tracks 154. The rubber tracks 154 could be replaced by wheels. An engine 156 supplies power for the tracks 154 as well as the various moving components in combine 11. An operator operates combine 11 from a cab 158.

In operation the operator will connect header support 13 to header 17 and feeder 21. Connection of reel 19 is optional and is preferably not used for harvesting some crops, such as corn. Referring to FIGS. 2, 5 and 6, main drive shaft 72 is connected to telescoping drive shaft 103 by knuckle joint 105. Another knuckle joint connects shaft 103 to hydraulic clutch 101, which drives roller 127 and rotates shaft 84 when hydraulically engaged for transferring power. Hydraulic clutch 101 connects to shaft 84 of header drive means 70, which is a centerline type of header drive. Shaft 84 rotates to rotate worm gear 99, which rotates driven gear 100 and augers 73, 75. Rotation of shaft 84 also rotates shaft 85 and crankshaft 71 to reciprocate sickles 69, 71 to cut crop. Combine 11 is then driven forward in a direction along central axis 32, and sickles 67, 69 cut grain from the field. Cut crop falls inward into housing 61 of header 17 and is driven inwardly by augers 73, 75 to a central portion of header 17 disposed in vertical alignment with centerline 32, beneath centerline 32. Fingers 81 rotate to press crop through central discharge port 83 and into feeder 21.

Referring to FIG. 6, conveyors 23, 25 then move crop from forward end 111 to aft end 113. The crop is moved upward by ribs 117, 125 of conveyor belts 115, 123 respectively. Conveyors 23, 25 converge towards the aft end of feeder 21 to press the grain therebetween. Compressing the crop between conveyors 23, 25 both softens the stalks of the crop, to enhance crop feeding between threshing rotor 33 and perforated housing 37, and further to prethresh some grain from the crop. Rollers 121, 129 define a compression point 131 at aft end 113 of feeder 21, which provides a maximum compression of crop between conveyors 23 and 25. In the preferred embodiment, rollers 121 and 129 are offset such that the crop will be bent in passing therebetween. Crop is then passed from feeder 21 and through cover plate 31. Referring back to FIG. 1, prethreshed grain falls through perforated plate 26 and onto prethreshed grain conveyor 28. Prethreshed grain conveyor 28 then transports the prethreshed to shoe 39. The prethreshed grain then passes along shoe 39 and to sieves 41, 43 for processing with threshed grain from threshing assembly 24.

Referring to FIGS. 8 and 9, crop then passes from feeder means 21 and through apertures 133 and 135 in cover plate 31. Apertures 133, 135 are spaced apart to distribute the crop on opposite sides of rotor 33. Crop is pressed between cover plate 31, angle iron 137, impeller 35 and forward facing rasp bars 143 for further softening and threshing. Impeller blades 139 then press crop outward and into the clearances between threshing rotor 33 and perforated housing 37 for threshing grain therefrom.

Referring to FIG. 1, rotating rotor 33 within the rotating housing 37 threshes the crop. Straw will be drawn rearward by beaters 45 and distributed by straw spreaders 47. Clean grain falls through perforations in housing 37 onto shoe 39. The grain proceeds onto the upper sieve 41. The clean grain will fall through apertures in the upper sieve 41, lower sieve 43 and onto clean grain pan 51. Blower 49 discharges air through sieves 41, 43, blowing chaff out the rear of combine 11. Partially threshed tailings fall off the rearward end of the upper sieve 41 and into rethreshing section 53.

Rethreshing rotor 55 rotates to thresh tailings within housing 57. Chaff is removed from the rethreshed tailings by blowers 74. In the preferred embodiment of the present invention, the rethreshed tailings, including the clean grain separated by rethreshing in rethreshing section 53, are returned to tailings pan 64, and then to primary rotor 33 for rethreshing.

Elevator 54 is continuously moving to transport clean grain to storage bin 52 and rethreshed tailings to chute 68. Grain from clean grain pan 51 will fall into the clean grain compartments between paddles 58 and will be elevated up to auger 56. Auger 56 will discharge the clean grain into storage bin 52. Rethreshed tailings from tailing pan 64 will enter tailings compartments between tailings paddles 60 and be elevated up to chute 68. A downdraft is created in chute 68 by impeller blades 35, facilitating the downward flow of rethreshed tailings. The rethreshed tailings pass through rotor 33 and onto ripple shoe 39. The rethreshed tailings should then pass through sieves 41, 43 as clean grain.

In alternative embodiments (not shown), rethreshed grain may be passed from discharge 62 directly into clean grain pan 51 to be transported to storage bin 52. Additionally, in other embodiments of the present invention, the rethreshed grain may be conveyed from discharge 62 to ripple shoe 39 for further separation by sieves 41, 43.

FIG. 10 is a perspective view of a forward end of alternative cover plate 153. Plate 153 has a single aperture 155 through which crop is passed from a feeder into a threshing assembly. A wedge plate 157 is provided for pressing a portion of the crop flow upwards in passing through aperture 155, in direction 159. The rest of the crop flow passes through aperture 155 in direction 161. Thus, crop flow through aperture 155 and into a threshing assembly is directed into two separate directions, and to distal positions within the threshing assembly.

Referring to FIGS. 9 and 10, impeller blades 139 mounted to threshing rotor 33 then urge the crop flowing along flow path direction 161 to move downward. Impeller blades 139 also push the crop flowing along flow path direction 159 to move upwards and to a generally opposite side of rotor 33 than that which the crop which flows along flow path 161 passes. This provides for a more even distribution of crop within the threshing assembly, preventing crop buildups and jams around the threshing rotor, than if only a single aperture were provided for passing the crop into a threshing assembly in a single direction.

In other embodiments, a wedge, similar to wedge plate 157, may be provided in a cover plate similar to cover plate 31 for also directing the crop to pass in more than one direction and different distal positions around different sides of a threshing rotor. Further, wedge plate 157, although a part of a cover plate 153, need not be contiguous with cover plate 153. Further, in other embodiments, a cover plate may be provided having corrugations on the rearward facing end for pressing crop into to soften and prethresh crop.

Referring again to FIG. 8, in other embodiments of the present invention, rearward facing rasp bars may be used in place of angle iron 137 to provide a threshing surface on the rearward end of cover plate 31. The rearward facing rasp bars may be arranged in the pattern shown for angle iron 137, or may be in a different pattern. Angle iron 137 may also be arranged in a different pattern for pressing crop against for softening and threshing. Additionally, cover plate 31 may be provided with a rough rearward surface for threshing crop against by providing a corrugated rearward surface for plate 31.

FIGS. 11 and 12 depict an alternative sickle drive means 179 for reciprocating sickles 180, 182. Drive means 179 includes connecting rods 181, 183 connected at one end to offset bearing journals 185, 187, respectively, which are offset from the center of gears 189, 191. Gear 193 connects between gears 189, 191, and is connected to drive shaft 195 for rotating gears 189, 191. Rotation of gears of 189, 191 eccentrically rotates bearings 197, 199 around the center of rotations 196, 198 for gears 189, 191, respectively. Rotation of gears 189, 191 causes connecting rods 181, 183 to reciprocate, which reciprocate sickles 180 and 182.

FIG. 13 through 16 are elevational views which schematically depict alternative feeder means 163 through 166, respectively. Alternative feeder means 163 through 166 have upper conveyors which converge with the lower conveyors at intermediate points 167 through 170, respectively, between the forward and aft ends of alternative conveyors 163 through 166. Each of the upper conveyors has multiple rollers 171 through 174 for pressing against either multiple rollers 175 through 177, or support plate 178 of the lower conveyors. Further, support plate 178 may be omitted. Upper rollers may be aligned either adjacent to the lower rollers for pressing the crop directly therebetween, are offset for bending the crop passing therethrough, or a combination thereof. Adjustment means 181 through 183 are provided for selectively adjusting the spacings between conveyors, and may be adapted to adjust the forward and aft alignment as well. It should be noted, that the invention is not limited to feeders which extend between forward and aft ends for conveying crop between the forward and aft ends.

The present invention has several advantages over prior art grain combines. A header made according to the present invention has a centerline drive which directly connects to a central portion of the sickle means and a central portion of the auger means for passing mechanical power directly to the sickle means and header means. Further, a feeder made according to the present invention will prethresh and soften crop prior to passing the crop to the primary threshing rotor, allowing faster feeding rates of crop through the primary threshing rotor. Some grain is prethreshed from the crop in the feeder, prior to passing through the primary threshing rotor, and is passed through a perforated plate and transported from there on a prethreshed grain conveyor. A cover plate having multiple apertures directs crop in multiple directions to distally disposed positions, and preferably to opposite sides of the threshing rotor to provide more even distribution of crop around the rotor than prior art feeding means which may tend to overload one side of the threshing rotor. Additionally, crop is further softened and prethreshed by the forward facing rasp bars of an impeller having impeller blades which are mounted to the forward end of the threshing rotor. The forward facing rasp bars press the crop into the cover plate and angle iron mounted to the cover plate to prethresh the crop therebetween. Thus, a combine made according to the present invention may be operated more efficiently and at higher harvesting rates.

Although the invention has been described with reference to a specific embodiment and several alternative embodiments, this description is not meant to be construed in a limiting sense. Various modifications of the disclosed embodiments as well as other alternative embodiments of the invention will become apparent to persons skilled in the art upon reference to the description of the invention. It is therefore contemplated that the appended claims will cover any such modifications or embodiments that fall within the true scope of the invention.

I claim:

1. In a grain combine of the type having a threshing assembly disposed within a central housing for threshing grain from crop, a header housing having outermost ends which extend from the grain combine on opposite lateral sides of the central housing and a header discharge port defined between the outermost ends of the header housing, a feeder for transporting the crop from the header discharge port to the threshing assembly for threshing, a sieve section for receiving threshed crop from the threshing assembly and separating the grain from chaff and tailings, and grain conveyance means for transporting the grain which passes through the sieve section to a storage bin, the improvement comprising:

sickle means movably secured to the header housing and having a central portion, disposed between the outermost ends of the header housing, from which the sickle means laterally extends toward the outermost ends the header housing for moving relative to the header housing to sever the crop from a field;

header drive connecting directly to the central portion of the sickle means for transferring mechanical power from a drive shaft means directly to the central portion of the sickle means to move the sickle means and sever the crop from the field;

transport means movably secured to the header housing and having an intermediate section, disposed between the outermost ends of the header housing, from which the transport means laterally extends toward the outermost ends of the header housing for moving relative to the header housing to transport the crop inward to the header discharge port;

the header drive connecting directly to the intermediate section of the transport means for transferring mechanical power from the drive shaft means directly to the intermediate section of the transport means to move the transport means relative to the header housing and transport the crop.

2. The grain combine according to claim 1, wherein the header drive is proximately disposed in vertical alignment with a centerline for the grain combine which extends through forward and aft ends of the grain combine.

3. The grain combine according to claim 1, wherein the header drive comprises:

a crankshaft rotatably connected to the header housing and coupled to the drive shaft means for rotating therewith, the crankshaft having two bearings which are offset from and rotate around a central axis of rotation for the crankshaft; and two connecting rods each separately and rotatably connected to different ones of the two bearings of the crankshaft, and each separately extending in opposite directions toward different ones of the outermost ends of the header housing for connecting opposite sides of the sickle means to the crankshaft for reciprocating the sickle means relative to the header housing in response to the crankshaft rotating.

4. The grain combine according to claim 1, wherein the header drive comprises:

two splined shafts which are rotatably mounted to the header housing and extend from opposite sides of the drive shaft means towards opposite ones of the outermost ends of the header means for connecting to opposite sides of the transport means for rotating the transport drive relative to the header housing to transport the crop; and power transfer means interconnecting between the drive shaft means and the two splined shafts for transferring mechanical power from the drive shaft means to the two splined shafts.

5. The grain combine according to claim 1, wherein the header drive comprises:

a crankshaft rotatably connected to the header housing and coupled to the drive shaft means for rotating therewith, the crankshaft having two bearings which are offset from and rotate around a central axis of rotation for the crankshaft;

two connecting rods each separately and rotatably connected to different ones of the two bearings of the crankshaft, and each separately extending in opposite directions toward different ones of the outermost ends of the header housing for connecting opposite sides of the sickle means to the crankshaft for reciprocating the sickle means relative to the header housing in response to the crankshaft rotating;

two splined shafts which are rotatably mounted to the header housing and extend from opposite sides of the drive shaft means towards opposite ones of the outermost ends of the header housing for connecting to opposite sides of the transport means for rotating the transport means relative to the header housing to transport the crop in response to the drive shaft means rotating; and worm and driven gears interconnecting between the drive shaft means and the two splined shafts for transferring mechanical power from the drive shaft means to the two splined shafts.

6. The grain combine according to claim 1, further comprising:

a cover plate extending between the feeder and the threshing assembly, the cover plate having directing means for directing the crop to flow into the threshing assembly in two directions;

a lower conveyor included within the feeder, extending between the first and second ends of the feeder, and having a continuously extending lower conveyor belt;

an upper conveyor included within the feeder, disposed above the lower conveyor belt, extending between the first and second ends of the feeder, and having a continuously extending upper conveyor belt;

wherein the upper and lower conveyors are vertically aligned with the upper conveyor above the lower conveyor with a space defined therebetween for receiving the crop from the header discharge port, and conveying the crop to the second end of the feeder for discharging the crop from the feeder to the central housing and the threshing assembly; and wherein the upper and lower conveyors are aligned to converge in passing the crop from the first end to the second end of the feeder for pressing the crop therebetween to prethresh the crop, prior to passing the crop into the threshing assembly.

7. In a grain combine of the type having a threshing assembly disposed within a central housing for threshing grain from crop, a header housing having outermost ends which extend from the grain combine on opposite lateral sides of the central housing and a header discharge port defined between the outermost ends the header housing, a feeder for transporting the crop from the header discharge port to the threshing assembly for threshing, a sieve section for receiving threshed crop from the threshing assembly and separating the grain from chaff and tailings, and grain conveyance means for transporting the grain which passes through the sieve section to a storage bin, the improvement comprising:

centerline drive means mounted to the header housing between the outermost ends of the header housing, and having a first end rotatably connected to the header housing for securing to a drive shaft means;

first and second sickle sections, each movably secured to the header housing and directly connected to the centerline drive means for extending therefrom toward a different one of the opposite ends of the header housing from the other of the first and second sickle sections, and reciprocating relative to the header housing to sever crop from a field;

first and second auger sections, each rotatably secured to the header housing and directly connected to the centerline drive means for extending therefrom toward a different one of the opposite ends of the header housing from the other of the first and second auger sections, and moving relative to the header housing to transport crop toward the header discharge port; and wherein the centerline drive means transfers mechanical power from the drive shaft means directly to each of the first and second sickle sections to sever crop from the field, and directly to each of the first and second auger sections to transport crop to the header discharge port.

8. The grain combine according to claim 7, wherein the centerline drive means is proximately disposed along a centerline of the grain combine, which extends through forward and aft ends of the grain combine.

9. The grain combine according to claim 7, wherein the centerline drive means comprises:

a crankshaft rotatably connected to the header housing and coupled to the drive shaft means for rotating therewith, the crankshaft having two bearings which are offset from and rotate around a central axis of rotation for the crankshaft; and two connecting rods, which are each separately and rotatably connected to a different one of the two bearings, and each separately extending in opposite directions from the crankshaft toward different ones of the outermost ends of the header housing for connecting separate ones of the first and second sickle sections to the crankshaft for reciprocating relative to the header housing in response to the crankshaft rotating.

10. The grain combine according to claim 7, wherein the centerline drive means comprises:

two splined shafts rotatably mounted to the header housing, and each extending from opposite lateral sides of the centerline drive means towards different ones of the outermost ends of the header means from the other of the two splined shafts, for directly connecting to separate ones of the first and second auger sections for rotating the auger sections relative to the header housing to transport the crop; and worm and driven gears interconnecting between the drive shaft means and the two splined shafts for transferring mechanical power from the drive shaft means to the two splined shafts to rotate the first and second auger sections.

11. The grain combine according to claim 7, wherein the centerline drive means comprises:

a crankshaft rotatably connected to the header housing and coupled to the drive shaft means for rotating therewith, the crankshaft having two bearings which are offset from and rotate around a central axis of rotation for the crankshaft;

two connecting rods, which are each separately and rotatably connected to a different one of the two bearings, and each separately extending in opposite directions from the crankshaft toward different ones of the outermost ends of the header housing for connecting separate ones of the first and second sickle sections to the crankshaft for reciprocating relative to the header housing in response to the crankshaft rotating;

two splined shafts rotatably mounted to the header housing, and each extending from opposite lateral sides of the centerline drive means towards different ones of the outermost ends of the header means from the other of the two splined shafts, for directly connecting to separate ones of the first and second auger sections for rotating the auger sections relative to the header housing to transport the crop; and worm and driven gears interconnecting between the drive shaft means and the two splined shafts for transferring mechanical power from the drive shaft means to the two splined shafts to rotate the first and second auger sections.

12. The grain combine according to claim 7, further comprising:

two laterally disposed belts included within the feeder for transporting the crop between the header discharge port and the threshing assembly, wherein the two laterally disposed belts are spaced apart for extending at least one of the drive shaft means and the centerline drive means therebetween for transferring mechanical power to the centerline means.

13. The grain combine according to claim 7, further comprising:

a lower conveyor included within the feeder, extending between the first and second ends of the feeder and having a continuously extending lower conveyor belt;

an upper conveyor included within the feeder, disposed above the lower conveyor belt, extending between the first and second ends of the feeder, and having a continuously extending upper conveyor belt;

wherein the upper and lower conveyors are vertically aligned with the upper conveyor above the lower conveyor with a space defined therebetween for receiving the crop from the header discharge port, and conveying the crop to the second end of the feeder for discharging the crop from the feeder to the central housing and the threshing assembly; and wherein the upper and lower conveyors are aligned to converge in passing the crop from the first end to the second end of the feeder for pressing the crop therebetween to prethresh the crop, prior to passing the crop into the threshing assembly.

14. In a grain combine of the type having a threshing assembly disposed within a central housing for threshing grain from crop, a header for severing crop from a field and directing the crop to flow through a header discharge port, a feeder for transporting the crop from the header discharge port to the threshing assembly for threshing, a sieve section for receiving threshed crop from the threshing assembly and separating the grain from chaff and tailings, and grain conveyance means for transporting the grain which passes through the sieve section to a storage bin, the improvement comprising:

a lower conveyor included within the feeder, extending between the first and second ends of the feeder, and having a continuously extending lower conveyor belt with laterally extending lower ribs;

an upper conveyor included within the feeder, disposed above the lower conveyor belt, extending between the first and second ends of the feeder, and having a continuously extending upper conveyor belt with laterally extending upper ribs;

wherein the upper and lower conveyors are vertically aligned with the upper conveyor above the lower conveyor with a space defined therebetween for receiving the crop from the header discharge port, and conveying the crop to the second end of the feeder for discharging the crop from the feeder to the central housing and the threshing assembly; and wherein the upper and lower conveyors are aligned to converge in passing the crop from the first end to the second end of the feeder for pressing the crop therebetween to prethresh the crop, prior to passing the crop into the threshing assembly.

15. The grain combine according to claim 14, wherein the upper and lower conveyors converge at a compression point disposed across the second end of the feeder to prethresh the crop.

16. The grain combine according to claim 14, further comprising:

multiple rollers included within the upper conveyor for pushing the upper conveyor downward toward the lower conveyor to define multiple compression points, which extend between the upper and lower conveyors and between the first and second ends of the feeder for prethreshing crop therebetween.

17. The grain combine according to claim 14, further comprising:

a perforated plate extending proximate to the second end of the feeder for separating prethreshed grain from the crop passing to the threshing assembly; and a prethreshed grain conveyor extending between the perforated plate and the sieve section for conveying the prethreshed grain between the perforated plate and the sieve section.

18. The grain combine according to claim 14, further comprising:

wherein the upper and lower conveyors converge at a compression point disposed across a second end of the feeder to prethresh the crop at the second end of the feeder;

a perforated plate extending proximate to the second end of the feeder for separating prethreshed grain from the crop passing through the second end of the feeder and to the threshing assembly; and a prethreshed grain conveyor extending between the perforated plate and the sieve section for conveying the prethreshed grain between the perforated plate and the sieve section.

19. The grain combine according to claim 14, further comprising:

a cover plate extending between the feeder and the primary threshing rotor, the cover plate having two apertures extending therethrough, one on each side of the cover plate, for directing the crop to flow into the threshing assembly in two directions and to distally disposed sides of the threshing assembly.

20. The grain combine according to claim 14, further comprising:

sickle means included within the header for reciprocating relative to a header housing to sever crop from the field;

auger means included within the header for rotating relative to the header housing for transporting crop to and directing the crop to flow through the header discharge port; and a centerline drive and drive shaft means extending directly through a centrally disposed section of the header housing for transferring mechanical power directly to portions of the sickle and auger means disposed centrally between outermost lateral ends of the header housing for reciprocating the sickle means and rotating the auger means relative to the header housing, on opposite lateral sides of the centerline drive.

21. In a grain combine of the type having a threshing assembly disposed within a central housing for threshing grain from crop, a header for severing crop from a field and directing the crop to flow through a header discharge port, a feeder for transporting the crop from the header discharge port to the threshing assembly for threshing, a sieve section for receiving threshed crop from the threshing assembly and separating the grain from chaff and tailings, and grain conveyance means for transporting the grain which passes through the sieve section to a storage bin, the improvement comprising:

a plate extending between the feeder and the threshing assembly, the plate having directing means for directing the crop to flow into the threshing assembly in two directions for passing to distally disposed sides of the threshing assembly.

22. The grain combine according to claim 21, wherein:

the plate extends transverse to a direction in which the crop flows in passing from the feeder and into the threshing assembly; and the directing means is provided by two apertures extending through the plate, one on each side of the plate, for passing the crop therethrough and into the threshing assembly in the two different directions and to the distally disposed sides of the threshing assembly.

23. The grain combine according to claim 21, wherein:

the plate extends transverse to a direction in which the crop flows in passing from the feeder and into the threshing assembly;

an aperture extends through the plate for passing the crop into the threshing assembly; and the directing means is a displacement member disposed proximate to the aperture for directing a portion of the crop to flow in one of the two different directions and to one of the distally disposed sides of the threshing assembly.

24. The grain combine according to claim 21, wherein:

the plate extends transverse to a direction in which the crop flows in passing from the feeder and into the threshing assembly;

an aperture extends through the plate for passing the crop into the threshing assembly; and the directing means comprises a wedge disposed proximate to the aperture for directing a portion of the crop to flow in one of the two different directions and to one of the sides of the threshing assembly.

25. The grain combine according to claim 21, further comprising:

the threshing assembly including a threshing rotor and an impeller mounted forward of the threshing rotor, facing a rearward end of the plate; and rearward facing bars mounted to the rearward end of the plate for threshing the crop between the rearward facing bars and the impeller.

26. The grain combine according to claim 21, further comprising:

the threshing assembly including a threshing rotor and an impeller mounted forward of the threshing rotor, facing a rearward end of the plate; and forward facing rasp bars mounted to the forward end of the impeller and extending from the impeller toward the rearward end of the plate for rotating relative to the plate and threshing the crop therebetween.

27. The grain combine according to claim 21, further comprising:

rearward facing bars mounted to a rearward end of the plate;

the threshing assembly including a threshing rotor and an impeller mounted forward of the threshing rotor and facing the rearward end of the plate; and forward facing rasp bars mounted to the forward end of the impeller and extending from the impeller toward the rearward end of the plate for rotating relative to the plate and threshing the crop therebetween.

28. The grain combine according to claim 21, further comprising:

sickle means included within the header for reciprocating relative to a header housing to sever the crop from the field;

auger means included within the header for rotating relative to the header housing for transporting the crop to and directing the crop to flow through the header discharge port; and a centerline drive and drive shaft means extending directly through a centrally disposed section of the header housing for transferring mechanical power directly to portions of the sickle and auger means disposed centrally between outermost lateral ends of the header housing for reciprocating the sickle means and rotating the auger means relative to the header housing, on opposite lateral sides of the centerline drive.

29. The grain combine according to claim 21, further comprising:

a lower conveyor included within the feeder, extending between the first and second ends of the feeder, and having a continuously extending lower conveyor belt;

an upper conveyor included within the feeder, disposed above the lower conveyor belt, extending between the first and second ends of the feeder, and having a continuously extending upper conveyor belt;

wherein the upper and lower conveyors are vertically aligned with the upper conveyor above the lower conveyor with a space defined therebetween for receiving the crop from the header discharge port, and conveying the crop to the second end of the feeder for discharging the crop from the feeder to the central housing and the threshing assembly; and wherein the upper and lower conveyors are aligned to converge in passing the crop from the first end to the second end of the feeder for pressing the crop therebetween to prethresh the crop, prior to passing the crop into the threshing assembly.

30. In a grain combine of the type having a threshing assembly disposed within a central housing for threshing grain from crop, a header for severing crop from a field and directing the crop to flow through a header discharge port, a feeder for transporting the crop from the header discharge port to the threshing assembly for threshing, a sieve section for receiving threshed crop from the threshing assembly and separating the grain from chaff and tailings, and grain conveyance means for transporting the grain which passes through the sieve section to a storage bin, the improvement comprising:

a plate extending between the feeder and the threshing assembly, the plate having a protuberances which extend from a rearward facing surface of the plate and an aperture through which the crop flows to pass into the threshing assembly;

the threshing assembly including a threshing rotor and an impeller mounted forward of the threshing rotor, facing the protuberances of the rearward facing surface of the plate; and wherein a forward end of the impeller and the protuberance of the rearward facing surface of the plate are spaced apart for rotating the forward end of the impeller relative to the plate and threshing the crop therebetween.

31. The grain combine of claim 30, wherein the protuberances of the rearward facing surface of the plate comprises:

a rearward facing side of the plate; and bars mounted to the rearward facing side of the plate.

32. The grain combine of claim 30, wherein the protuberances of the rearward facing surface of the plate comprises:

a rearward facing side of the plate; and bars of angel iron mounted to the rearward facing side of the plate to provide rearwardly extending blades.

33. The grain combine of claim 30, wherein the impeller comprises:

rasp bars mounted to the forward end of the impeller for threshing crop against the rearward facing surface of the plate.

34. In a grain combine of the type having a threshing assembly disposed within a central housing for threshing grain from crop, a header for severing crop from a field and directing the crop to flow through a header discharge port, a feeder for transporting the crop from the header discharge port to the threshing assembly for threshing, a sieve section for receiving threshed crop from the threshing assembly and separating the grain from chaff and tailings, and grain conveyance means for transporting the grain which passes through the sieve section to a storage bin, the improvement comprising:

a plate extending between the feeder and the threshing assembly, the plate having a rearward facing surface and an aperture through which the crop flows to pass into the threshing assembly;

the threshing assembly including a threshing rotor and an impeller mounted forward of the threshing rotor, facing the rearward facing surface of the plate; and rasp bars mounted to the forward end of the impeller, spaced apart from the rearward facing surface of the plate for rotating relative to the rearward facing surface of the plate to thresh the crop therebetween.

35. The grain combine of claim 34, further comprising:

bars mounted to the rearward facing surface of the plate, rearwardly extending toward the rasp bars for threshing crop therebetween.

36. A method for operating a grain combine of the type having a threshing assembly disposed within a central housing for threshing grain from crop, a header for severing crop from a field and directing the crop to flow through a header discharge port, a feeder for transporting the crop from the header discharge port to the threshing assembly for threshing, a sieve section for receiving threshed crop from the threshing assembly and separating the grain from chaff and tailings, and grain conveyance means for transporting the grain which passes through the sieve section to a storage bin, the method comprising the steps of:

providing a centerline header drive means for transferring mechanical power from a drive shaft means extending in a forward direction in relation the combine and directly to an intermediate portion of the header, which is a centrally disposed between outer ends of the header which extend on opposite lateral sides of the drive shaft means;

transferring the mechanical power directly to the intermediate portion of the header, and, from the intermediate portion, to portions of the header which extend toward the outer ends of the header to sever crop from the field on laterally opposite sides of the intermediate portion and to direct the crop to flow from the laterally opposite sides of the header through the header discharge port;

transporting the crop from the header discharge port, through the feeder, and to the threshing assembly;

directing the crop into and through the threshing assembly to thresh grain from the crop;

passing the crop, after threshing, through a sieve section and separating the grain from chaff and tailings; and transporting the grain which passes through the sieve section to a storage bin.

37. The method according to claim 36, further comprising the steps of:

further providing the feeder with an upper and lower conveyor belt which both extend from a first end of the feeder to a second end of the feeder and converge in passing the crop from the first to the second end to compress the crop therebetween, to prethresh the crop prior to passing the crop to the threshing assembly; and transporting the crop from the header discharge port, through the feeder, between the upper and lower conveyor belts to prethresh the crop, and then, to the threshing assembly.

38. The method according to claim 36, further comprising the steps of:

further providing a plate having a directing means for directing the crop to flow into the threshing assembly in two directions for passing to distally disposed sides of the threshing assembly; and directing, by means of the plate, the crop to flow into the threshing assembly in the two directions, and through the distally disposed sides of the threshing assembly to thresh grain from the crop.

39. A method for operating a grain combine of the type having a threshing assembly disposed within a central housing for threshing grain from crop, a header for severing crop from a field and directing the crop to flow through a header discharge port, a feeder for transporting the crop from the header discharge port to the threshing assembly for threshing, a sieve section for receiving threshed crop from the threshing assembly and separating the grain from chaff and tailings, and grain conveyance means for transporting the grain which passes through the sieve section to a storage bin, the method comprising the steps of:

providing the feeder with an upper and lower conveyor belt which both extend from a first end of the feeder to a second end of the feeder and converge in passing the crop from the first to the second end to compress the crop therebetween, to prethresh the crop prior to passing the crop to the threshing assembly;

operating the header to sever crop from a field and direct the crop to flow through a header discharge port;

transporting the crop from the header discharge port, through the feeder, between the upper and lower conveyor belts to prethresh the crop, and then, to the threshing assembly;

directing the crop into and through the threshing assembly to thresh grain from the crop;

passing the crop, after threshing, through a sieve section and separating the grain from chaff and tailings; and transporting the grain which passes through the sieve section to a storage bin.

40. The method according to claim 39, further comprising the steps of:

further providing a perforated plate for separating prethreshed grain from crop;

passing the crop across the perforated plate to separate the prethreshed grain from the crop passing to the threshing assembly; and transporting the prethreshed grain from the perforated plate, and to the storage bin.

41. The method according to claim 39, further comprising the steps of:

further providing a perforated plate for separating prethreshed grain from crop and prethreshed grain conveyance means extending from the feeder toward the sieve section for conveying prethreshed grain therebetween;

passing the crop across the perforated plate to separate the prethreshed grain from the crop passing to the threshing assembly; and transporting the prethreshed grain from the perforated plate, and to the sieve section, through the sieve section, and to the grain conveyance means for transporting to the storage bin.

42. A method for operating a grain combine of the type having a threshing assembly disposed within a central housing for threshing grain from crop, a header for severing crop from a field and directing the crop to flow through a header discharge port, a feeder for transporting the crop from the header discharge port to the threshing assembly for threshing, a sieve section for receiving threshed crop from the threshing assembly and separating the grain from chaff and tailings, and grain conveyance means for transporting the grain which passes through the sieve section to a storage bin, the method comprising the steps of:

providing a plate having a directing means for directing the crop to flow into the threshing assembly in two directions for passing to distally disposed sides of the threshing assembly;

operating the header to sever crop from a field and direct the crop to flow through a header discharge port;

transporting the crop from the header discharge port, through the feeder, and to the threshing assembly;

directing, by means of the plate, the crop to flow into the threshing assembly in the two directions, and through the distally disposed sides of the threshing assembly to thresh grain from the crop;

passing the crop, after threshing, through a sieve section and separating the grain from chaff and tailings; and transporting the grain which passes through the sieve section to a storage bin.

43. The method according to claim 42, wherein the step of directing, by means of the plate, the crop to flow in the two directions within the threshing assembly comprises the step of:

passing the crop through two separate apertures, which extend through the plate and on opposite sides of the plate, and which provide the directing means for directing the crop to flow into the threshing assembly in the two directions.

44. The method according to claim 42, wherein the step of directing, by means of the plate, the crop to flow in the two directions within the threshing assembly comprises the step of:

passing the crop through an aperture extending through the plate, and against a wedge member which is disposed proximate to the aperture to provide the directing means for directing the crop to flow into the threshing assembly in the two directions.

45. The method according to claim 42, further comprising the steps of:

further providing the feeder with an upper and lower conveyor belt which both extend from a first end of the feeder to a second end of the feeder and converge in passing the crop from the first to second end to compress the crop therebetween, to prethresh the crop prior to passing the crop to the threshing assembly; and prethreshing the crop between the upper and lower conveyor belts as the crop is passing through the feeder, prior to passing the crop into the central housing and to the threshing assembly.

\* \* \* \* \*